Figure 1:
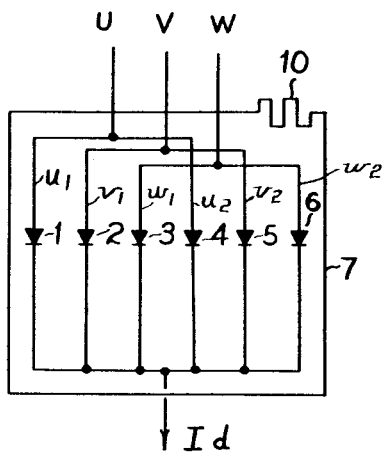

INVENTORS
Armand Brandt
Werner Faust

United States Patent Office 3,356,925
Patented Dec. 5, 1967

3,356,925
DEVICE FOR EQUALIZING ALTERNATING CURRENTS FLOWING IN DIFFERENT CONDUCTORS
Armand Brandt, Lucerne, and Werner Faust, Nussbaumen, Switzerland, assignors to Aktiengesellschaft Brown, Boveri & Cie, Baden, Switzerland, a joint-stock company
Filed July 6, 1964, Ser. No. 380,525
Claims priority, application Switzerland, July 16, 1963, 8,879/63
7 Claims. (Cl. 321—11)

This invention relates to a device for equalizing alternating currents flowing in different conductors, particularly in high power rectifier installations in which a plurality of conductors connected electrically in parallel for each phase feed alternating current (A.C.) to the several rectifiers located in said parallel connected conductors.

Devices known to the art for equalizing currents substantially operate by equalizing the inductances in the parallel conductors. In order to do this reactance coils with iron cores or balancing transformers which magnetically couple the parallel circuits are used.

However, these devices have the drawback that they must be provided in each of the A.C. conductors so that in high power equipment comprising a large number of parallel branches, as in semiconductor rectifying equipment, a very considerable number of equalizing devices is needed. This naturally raises the cost of the equipment besides occupying considerable space.

In another known arrangement which seeks to overcome this drawback the A.C. conductors are themselves contrived to provide inductance. At points where electrical connections are needed, a loop, known as a balancing loop, replaces the normal straight connection. These loops have inductances which are capable of equalizing the distribution of currents to some extent.

However, this expedient likewise has the drawback of necessitating the provision of cumbersome conductor connections, particularly when currents are high, which naturally take up considerable space in a control panel.

Another proposal consists in providing the conductors with iron cores which have a kind of braking effect, and which are thus capable of exercising an equalizing effect on the currents. However, this device is likewise open to criticism because the size of the iron core must be adapted to the magnitude of the differences existing between the several conductors. Consequently, different cores must be mounted on different conductors. Since the inductances affect the commutation of the currents between the phases, the inductances of conductors carrying different phases should actually be as closely alike as is possible. When phase conductors U, V and W are located side by side, the conductor loop determining commutation is greater in the two outer phase conductors U and W than in the phase conductor U and V. For equalization the cores used for the inner phase conductor must therefore be larger than those used for the outer phase conductor.

In order to overcome these difficulties the present invention proposes an equalizing device consisting of a supplementary closed conductor loop which is conductively isolated from the electrically paralleled current-carrying conductors, a single loop being used, and this loop being common to all of the current carrying conductors feeding the rectifier elements in the rectifier system.

Figure 2:
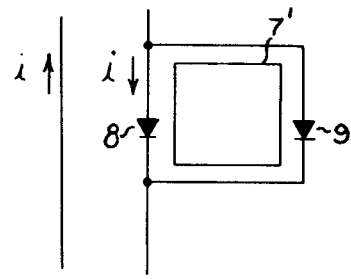

Two embodiments of the invention are to be described and are illustrated in the accompanying drawings wherein:

FIG. 1 is an electrical schematic of a three-phase rectified power supply system wherein each phase is composed of two conductors connected electrically in parallel and wherein a rectifier element is located in each conductor, all of the conductors being surrounded by a closed loop in which short-circuit currents are produced which effect current balancing as between the electrically paralleled conductors of each phase; and FIG. 2 is a view similar to FIG. 1 where in the inventive concept is also applied to a circuit which contains rectifier units located in conductors connected electrically in parallel, the closed loop being located inside the rectifier loop.

With reference now to the drawings, and to FIG. 1 in particular, the three-phase alternating current power supply feeding the rectifier units 1 to 6 is designated U, V and W. Each phase of this power supply includes a pair of conductors connected electrically in parallel and each conductor includes a rectifier. Thus, the two electrically paralleled conductors $u_1$ and $u_2$ of phase U include rectifiers 1 and 4, the electrically parallel conductors $v_1$ and $v_2$ of phase V include rectifiers 2 and 5, and the electrically paralleled conductors $w_1$ and $w_2$ of phase W include rectifiers 3 and 6. Commutation must be effected from rectifiers 1 to 2 and 4 to 5 when commutation takes place from phase U to V. It will be readily understood that commutation from W to U should be effected by commutation of rectifier 6 to 4 and 3 to 1, in which case the conductor loops are longer and therefore have a greater inductance. Hence, commutation which substantially depends upon the input inductance will be different according to whether the change-over is from phase U to V or from W to U. In order to compensate this difference, a closed loop 7 is arranged to surround the entire system of conductors. The short circuit current in the closed loop will then reduce the inductances, particularly of the outer conductors. It will also be clear that the presence of this closed loop will have less effect on the inner conductors, but these are precisely the conductors which call for less compensation. Hence, the presence of the closed loop will bring about a very evenly balanced distribution of currents in the electrically paralleled conductors of each phase and the further advantage also arises that balance can thus be achieved in all conductors by the provision of only one balancing means.

Furthermore, by moving the closed loop in relation to the system of current-carrying conductors, balance can be improved by varying the effect on individual conductors. Moreover, the size of the closed loop may itself be varied. At the same time balance is also achieved between the parallel conductors so that the single closed loop permits every inequality in the current distribution to be controlled.

FIG. 2 illustrates a different embodiment which applies to the case that equalization is required between two parallel rectifiers. In this case the closed loop which is indicated by reference number 7', is located inside the parallel loop between the two rectifiers 8 and 9.

Instead of only two parallel rectifiers, groups of rectifiers accommodated for instance in different tiers on a rectifier staging may be connected in parallel and provided in analogous manner with closed conductor loops.

Moreover, for better adjustment, the closed loop may include a resistor, as indicated at 10 in FIG. 1. This resistor may be variable and thus provide a facility for very convenient adaptation to prevailing conditions.

It will be understood from the drawings that it is simple to provide the closed conductor loops. They can be arranged to surmount the other conductors on insulators and they will then occupy no additional space.

It may be noted that the described arrangement can be used not only to equalize currents. In given circumstances it may be desirable to modify the distribution of currents in a particular way. This can also be accomplished with the aid of closed conductor rail loops, for instance, by locating such a loop asymmetrically in relation to the other conductors.

We claim:

1. In a high power rectifier system which comprises a plurality of conductors connected electrically in parallel for each phase of the alternating current supply source to be rectified and a rectifier unit connected to each conductor, the improvement which is characterized by the provision of a single auxiliary closed conductor loop which is conductively isolated from said electrically parallel conductors but inductively related thereto, said single auxiliary loop being common to all of said electrically parallel conductors feeding the entire rectifier system and which by virtue of the short-circuit current flowing therein serves to equalize the flow of alternating currents in said electrically parallel conductors.

2. A high power rectifier system as defined in claim 1 wherein said auxiliary closed conductor loop surrounds the outermost portions of said electrically parallel conductors such that the inductance of the loop established by the outermost ones of said conductors is reduced.

3. A high power rectifier system as defined in claim 2 wherein said electrically parallel conductors carry the same current.

4. A high power rectifier system as defined in claim 2 and which includes a polyphase network the several phases of which are connected to said electrically parallel conductors feeding said rectifiers.

5. A high power rectifier system as defined in claim 1 wherein said auxiliary closed conductor loop is located inside a current-carrying conductor loop formed by said electrically parallel conductors.

6. A high power rectifier system as defined in claim 1 wherein said auxiliary closed conductor loop is movable for controlling the desired distribution of current by varying the distance between it and said electrically parallel conductors.

7. A high power rectifier system as defined in claim 1 and which further includes an ohmic resistor connected in the circuit of said auxiliary closed conductor loop for varying the effect of said loop on the currents flowing in said electrically parallel conductors.

References Cited

UNITED STATES PATENTS

| | | | |
|---|---|---|---|
| 3,013,200 | 12/1961 | Dortort | 321—27 |
| 3,020,415 | 2/1962 | Dortort | 321—27 X |
| 3,193,754 | 7/1965 | Dortort | 321—27 |

JOHN F. COUCH, *Primary Examiner.*

G. GOLDBERG, *Assistant Examiner.*